F. H. AULD.
MEANS FOR SECURING NAME PLATES AND LIKE DEVICES TO OTHER STRUCTURES.
APPLICATION FILED JULY 28, 1914.
1,245,171.  Patented Nov. 6, 1917.
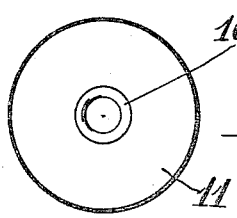
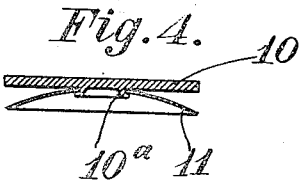
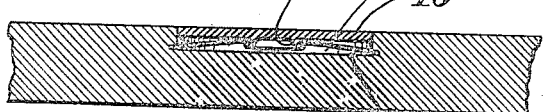
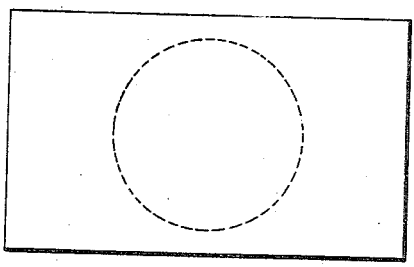
Witnesses
Benjamin Finckel
B. H. Grant
Inventor
Fredrick Howard Auld
By Finckel & Finckel
His Attorneys

UNITED STATES PATENT OFFICE.

FREDRICK HOWARD AULD, OF COLUMBUS, OHIO.

MEANS FOR SECURING NAME-PLATES AND LIKE DEVICES TO OTHER STRUCTURES.

1,245,171.      Specification of Letters Patent.      Patented Nov. 6, 1917.

Application filed July 28, 1914. Serial No. 853,722.

*To all whom it may concern:*

Be it known that I, FREDRICK HOWARD AULD, a citizen of the United States, residing at Columbus, in the county of Franklin and State of Ohio, have invented a certain new and useful Improvement in Means for Securing Name-Plates and like Devices to other Structures, of which the following is a specification.

The object of the invention is to provide convenient and effective means for securing a name plate or other article upon another object or structure such as a piece of furniture, a refrigerator, a vehicle, upon a machine or upon any other object where a name plate is desirable and can be applied. It is especially my object to provide means whereby such plates can be so secured as to render their removal difficult.

The invention is embodied in the example shown in the accompanying drawings and set forth in the following specification, the invention not being confined in its practical embodiment and application to the forms, materials and uses shown and stated.

In said drawings—

Figure 1 is a plan view of a name plate embodied in circular form.

Fig. 2 is a view of the lower side of the device shown in Fig. 1.

Fig. 3 is an edge view of the device shown in Figs. 1 and 2.

Fig. 4 is a diametrical section of the device shown in Figs. 1, 2 and 3.

Fig. 5 illustrates in section how the device is applied to a structure of wood.

Fig. 6 is a plan view of another form of the device.

Fig. 7 illustrates how the form shown in Fig. 6 can be applied to a structure of wood.

Fig. 8 is a cross section showing another form of securing device.

In the views and referring more particularly to Figs. 1 to 5 inclusive 10 designates the name plate or other member and 11 the securing member. The name plate member which can be of any suitable material, metal for example, can have formed on one face by any means or in any manner the desired legends, words, figures or design or if desired the member can be left plain. The securing member 11 is preferably of thin sheet metal of concavo-convex form. This securing member is shown as perforated to receive a boss $10^a$ on the name plate member, said boss being spun or pressed out to firmly engage the securing member. The securing member is thus connected with the name plate member by relatively slender means.

In applying the device to another structure the latter is provided with a socket 13, the rim wall of which is preferably of just sufficient circumference to receive the securing member and the securing member placed therein. A blow or suitable pressure upon the face of the name plate or article to be secured then so flattens the securing member as to cause its edge to penetrate or engage the wall of the socket or hole, as the case may be, thereby firmly connecting the name plate to the structure and preventing its removal except by destructive means. If it be desired that a name plate shall lie flush with the surface of the article to which the name plate is secured the socket should be made sufficiently deep for that purpose.

Referring now to Figs. 6 and 7 the name plate is shown as of oblong form and the securing member of circular form and also of smaller diameter than any diameter of the name plate. As shown in Fig. 7 the socket for receiving the securing member is cut deep enough to receive that member only. It is not necessary that the securing member penetrate to any considerable depth the wall of the socket as I have discovered that such a securing member effectively engages a smooth hard metallic wall. The form of securing device shown in Fig. 8 is especially adapted for engaging a smooth hard wall. When the device is connected with a through hole a plug, or anvil for expanding the securing device, such as shown at 14, is inserted into the hole at its lower end to support the device when the blow or pressure is applied. A rough wall, however, I believe is better to effect engagement and the invention will, therefore, be especially useful upon cast metal articles where a core for forming a socket for the name plate can be provided when the article is cast.

The securing member can be of any suitable form and is not necessarily circular as shown.

The many uses of the invention will readily occur to those skilled in the art. It is a common practice for retail merchants to remove the manufacturer's label and substitute their own. This practice will be prevented because the removal of labels applied with my invention will not only be difficult but will involve marring of the article.

A further advantage of this construction is that the securing device is expansible independently of the name plate or label so that legends, ornaments or other matter appearing upon the plate is not injured by the expansion or flexure of the securing device.

The forms of the parts can be varied in respects other than those herein stated without departing from the gist of the invention as claimed.

What I claim is:

1. The combination with a name plate, of a securing member therefor consisting of a concavo-convex plate attached to the name plate by relatively slender means, said securing member adapted to be spread edgewise into securing position without modifying the name plate, substantially as described.

2. The combination with a name plate of a securing member therefor consisting of a circular concavo-convex plate attached to the name plate by relatively slender means, said securing member adapted to be spread edgewise into securing position without modifying the name plate, substantially as described.

FREDRICK HOWARD AULD.

Witnesses:
HOWARD M. BELLOWS,
BENJAMIN FINCKEL.